April 10, 1934.    R. S. SANFORD    1,954,539
BRAKE
Original Filed Jan. 18, 1928
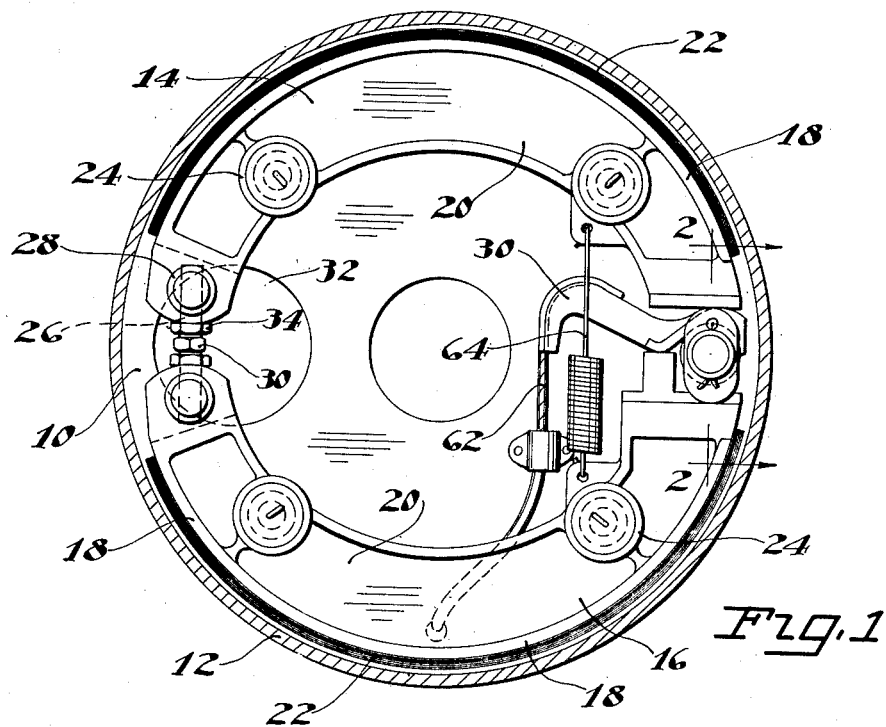
Fig.1
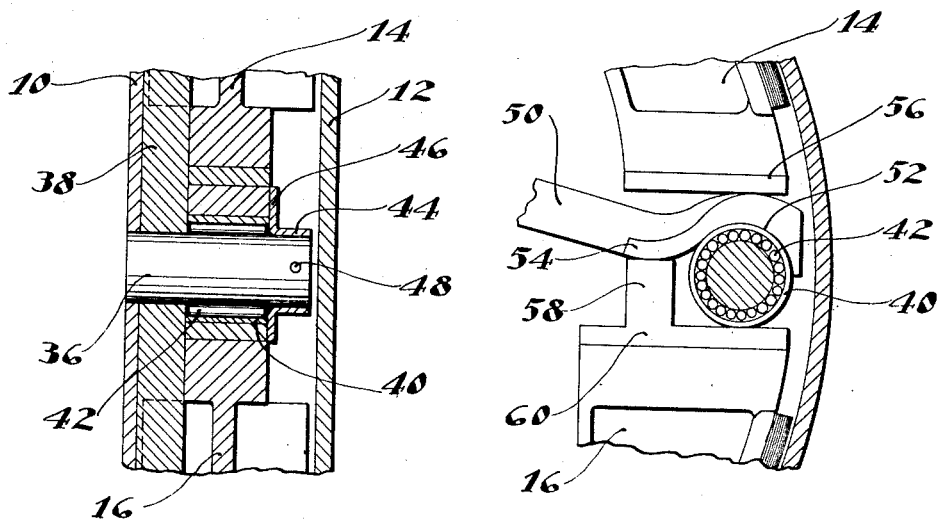
Fig.2
Fig.3
INVENTOR.
ROY S. SANFORD
BY
ATTORNEY Patented Apr. 10, 1934

1,954,539

UNITED STATES PATENT OFFICE 1,954,539

BRAKE

Roy S. Sanford, South Bend, Ind., assignor to Bendix Brake Company, South Bend, Ind., a corporation of Illinois Original application January 18, 1928, Serial No. 247,505. Divided and this application December 3, 1930, Serial No. 499,684

11 Claims. (Cl. 188—78)

This invention relates to brakes and more particularly to internal expanding brakes.

The present invention is a division of my pending application Serial No. 247,505, filed January 18, 1928.

The invention broadly comprehends an operating member for the friction elements of a brake arranged to apply these elements in either forward or reverse braking with smooth action devoid of objectionable noises.

An object of the invention is to provide an anti-friction mounting for the operating lever of a brake so that the lever may be operated with the least possible friction.

An important object of the invention is to provide an operating means for the friction element of a brake having an anti-friction bearing on a fixed anchor and line contact with the separable ends of the friction element, so that smooth operating effects may be attained with the least possible friction.

Another object of the invention is to provide an operating lever for the friction element of a brake having a compound curved cam adaptable for engagement with the separable ends of the friction element with line contact and to fulcrum on a roller bearing supported by a fixed anchor.

An important feature of the invention is a fixed anchor having positioned thereon a roller bearing supporting an operating member.

Another important feature is an operating lever supported on a fixed anchor and provided with a compound curved cam adaptable for engagement with the separable ends of the friction element with line contact.

Other objects of the invention will appear from the following description taken in connection with the drawing, which forms a part of this specification, and in which:

Figure 1 is a sectional view of a brake taken just back of the head of the drum illustrating the friction elements and operating member in elevation;

Figure 2 is a section substantially on line 2—2, Figure 1; and

Figure 3 is an enlarged detail view of the operating member.

Referring to the drawing for more specific details of the invention, 10 represents a fixed support such as a backing plate having associated therewith a rotatable drum 12. Positioned for movement on the backing plate is a friction element comprising a primary shoe 14 and a secondary shoe 16 which may be of any preferred type.

As shown, the shoes 14 and 16 are interchangeable. Each shoe comprises a rim 18 supported by a web 20 and a lining 22 suitably secured on the rim for co-operation with the braking surface of the drum. The shoes 14 and 16 are suitably supported on the backing plate by steady rests 24 which may be of any suitable known construction, but which are preferably arranged to retain the friction elements in any position to which they may be shifted by the whipping action of the drum to provide under all conditions an absolute minimum clearance between the friction element and the drum.

As shown, the articulated ends of the friction element or the shoes are connected by an adjusting member comprising a right and left threaded screw 26 having its respective ends threaded into suitable connectors or pivots 28 positioned for movement in transverse openings in the articulated ends of the shoes. The screw is provided with a polygonal portion 30 adaptable for the reception of an adjusting wrench which may be inserted through an opening 32 in the backing plate, and positioned on the screw are suitable lock nuts 34 adapted to retain the shoes in adjusted position.

Positioned between the separable ends of the friction elements 14 and 16 is a fixed anchor 36. As shown, the anchor 36 is pressed into a bracket or plate 38 secured in any desirable manner to the backing plate 10. Positioned on the anchor 36 is a sleeve 40 and interposed between the sleeve and the anchor is a plurality of rollers 42. As shown, a sleeve 44 is fitted snugly on the anchor 36 and this sleeve is provided with a circumferential flange 46 retaining the rollers 42 against endwise movement. The sleeve 46 is retained in position by a cotter pin 48 passing diametrally through the sleeve and the anchor.

A floating lever 50 is positioned on the anchor between the sleeve 40 and the shoe 14. This lever has a semi-cylindrical bearing surface 52 engaging the sleeve 40 and arranged on the lever is a cam 54 having compound curved engaging surfaces. These surfaces engage a wear plate 56 on the shoe 14 and a thrust member or projection 58 on a wear plate 60 attached to the shoe 16. The cam surfaces of the operating lever engage the wear plate 52 and thrust member 54 with line contact, so that friction between these parts is reduced to a minimum. The semi-cylindrical portion 52 of the operating lever 50 is adapted to rock, together with the sleeve 40, on the roller bearings 42. Hence, friction between these parts is nil or negligible.

As shown, the flange 46 on the sleeve 44 is extended to overlie the cam so that lateral movement of the operating lever 50 is avoided. The operating lever is connected by an operating cable 62 extending through the backing plate 10 to a suitable source of power, not shown, and connected between the shoes is the conventional return spring 64 adapted to return the shoes to the idle position.

In operation, force is applied to the lever 50 to rock the lever on the anti-friction rollers 42, and upon rocking the lever from its idle position, the separable ends of the shoes 14 and 16 are spread to engage the shoes with the braking surface of the drum. This movement of the shoes is accomplished through the compound curved engaging surfaces on the lever engaging the separable ends of the shoes 14 and 16. The engagement between the shoes and the compound curved surfaces is that of line contact. Hence, friction between these elements is reduced to a minimum.

The invention not only provides means for applying the friction elements to the braking surface of the drum with as little friction as is possible, but also provides means for applying these elements with a smooth operating effect devoid of objectionable noises.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed anchor, an anti-friction bearing on the anchor and a floating lever having one end engaging the anchor.

2. A brake comprising a fixed anchor, an anti-friction member positioned on the anchor and a lever having one end supported on the anti-friction member.

3. A brake comprising a floating friction device having separable ends, an anchor positioned between the ends, an anti-friction member on the anchor and an applying lever on the friction member having a portion curved to engage one of the separable ends and to clear the anchor and engage the other separable end.

4. A brake comprising a fixed support, a floating friction element having separable ends and positioned for movement on the support, a fixed anchor on the support between the separable ends of the friction element, an anti-friction member on the anchor and a lever on the anchor having a reversed curved surface engaging the separable ends of the friction element by line contact.

5. A brake comprising a fixed support, a rotatable drum associated therewith, a friction element on the support having separable ends, an anchor on the fixed support between the separable ends of the friction element, an anti-friction bearing on the anchor, a floating lever having one end supported by the bearing and means on the floating lever engaging the respective separable ends of the friction element.

6. A brake comprising a drum, a fixed anchor adjacent the drum, a sleeve surrounding the anchor in spaced relation thereto, a series of anti-friction rollers in the space between the anchor and the sleeve and a friction device having a radial surface in anchoring engagement with the sleeve.

7. A brake comprising a drum, a fixed anchor adjacent the drum, a sleeve surrounding the drum in spaced relation thereto, a series of anti-friction rollers in the space between the anchor and the sleeve and a floating friction device anchoring at one end against the sleeve when the drum is turning in one direction and anchoring at the other end against said sleeve when the drum is turning in the other direction.

8. A brake comprising an anchor, a bearing on the anchor, an operating member co-operating therewith and means on the anchor positively retaining the operating member and the bearing against displacement.

9. A brake comprising a fixed support, an anchor on the support, a bearing on the anchor including a series of anti-friction members, and a friction element engaging the anchor through the anti-friction bearing.

10. A brake comprising a fixed support, an anchor on the support, an anti-friction bearing including a series of rollers surrounding the anchor, and a friction element co-operating with the anchor through said bearing.

11. A brake comprising a fixed support, an anchor on the support, a friction element co-operating therewith, an operating member for the friction element and a member sleeved on the anchor retaining the friction element and operating member against displacement.

ROY S. SANFORD.